United States Patent [19]
Tuttle et al.

[11] Patent Number: 5,642,561
[45] Date of Patent: Jul. 1, 1997

[54] METHODS OF PRODUCING THIN PROFILE BATTERIES AND BATTERY TERMINAL HOUSING MEMBERS

[75] Inventors: Mark E. Tuttle, Boise; Rickie C. Lake, Eagle; John D. Fisher, Boise, all of Id.

[73] Assignee: Micron Communications, Inc., Boise, Id.

[21] Appl. No.: 599,347

[22] Filed: Feb. 9, 1996

[51] Int. Cl.$^6$ .................................................... H01M 2/08
[52] U.S. Cl. .............................. 29/623.2; 429/174
[58] Field of Search ........................ 29/623.2, 623.5; 429/174

[56] References Cited

U.S. PATENT DOCUMENTS

| | | | |
|---|---|---|---|
| 4,121,020 | 10/1978 | Epstein et al. | 429/174 X |
| 4,521,500 | 6/1985 | Watanabe | 429/174 |
| 5,486,431 | 1/1996 | Tuttle et al. | 29/623.2 X |

FOREIGN PATENT DOCUMENTS

| | | | |
|---|---|---|---|
| 0152 235 | 11/1981 | Germany. | |
| 57-165970 | 10/1982 | Japan | 29/623.2 |
| 60-230355 | 11/1985 | Japan | 29/623.2 |

*Primary Examiner*—Stephen Kalafut
*Attorney, Agent, or Firm*—Wells, St. John, Roberts, Gregory & Matkin P.S.

[57] ABSTRACT

A method of forming a button-type battery terminal housing member includes, a) providing an electrically conductive sheet having an exposed surface, the conductive sheet being larger than a desired resultant battery terminal housing member to be produced therefrom; b) providing a discrete solid gasket body, the gasket body being larger than a desired resultant gasket to be received relative to the battery terminal housing member; c) providing adhesive intermediate the conductive sheet exposed surface and the gasket body, and adhering the gasket body and conductive sheet together with the adhesive; d) positioning the conductive sheet with the gasket body adhered thereto between first and second forming members; and e) moving at least one of the forming members in the direction of the other to bear one of the forming members against the gasket body to simultaneously bend the solid gasket body and conductive sheet into a desired battery terminal housing member shape; the moving step also cutting through the gasket body, adhesive and conductive sheet; the adhesive retaining the solid gasket body fast against the conductive sheet outer surface during and after bending. The electrically conductive sheet is preferably circular in shape prior to the moving step. Further, the gasket body as-adhered to the conductive sheet is preferably in the shape of an annulus. The one forming member bears against the gasket body prior to the cutting action.

39 Claims, 4 Drawing Sheets

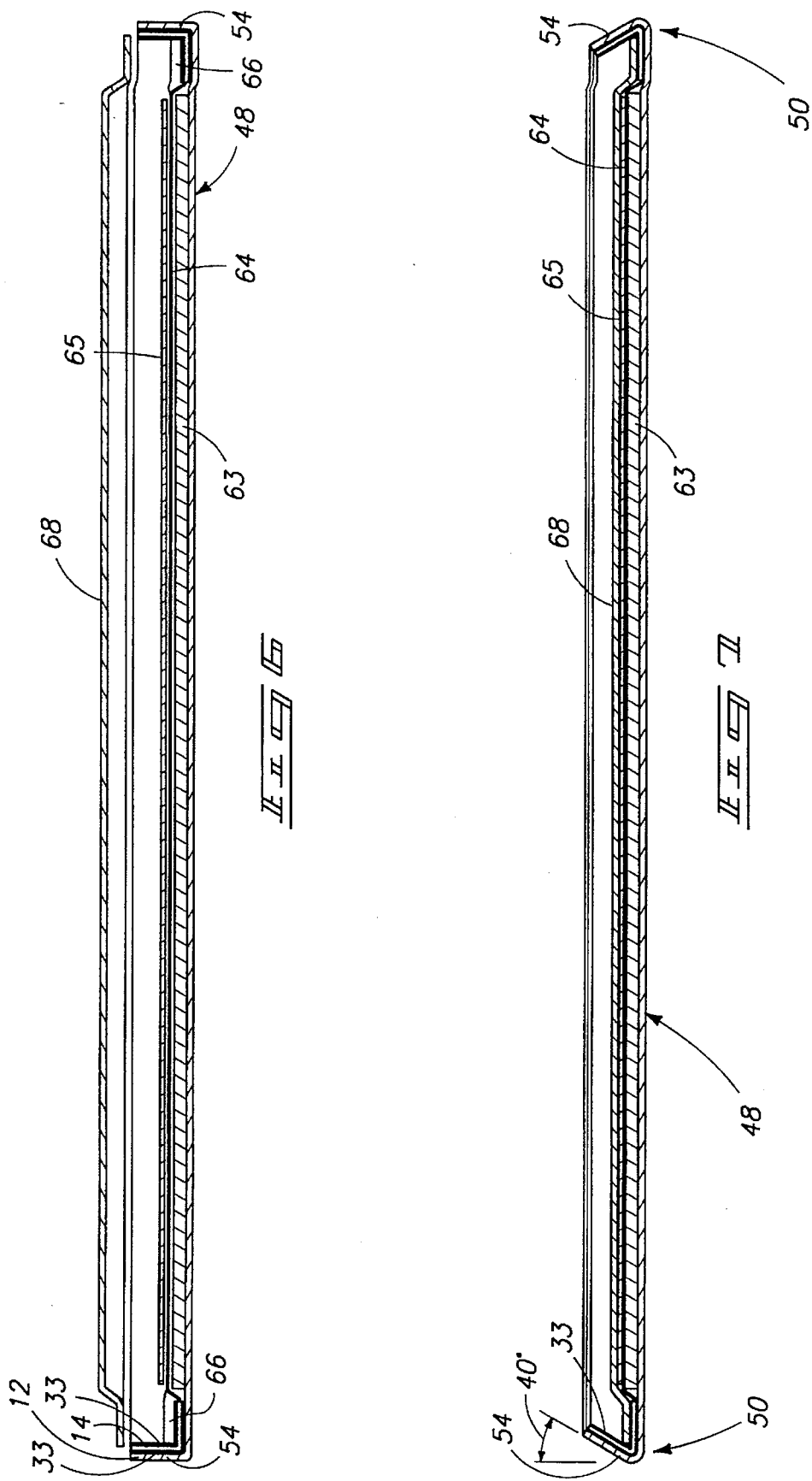

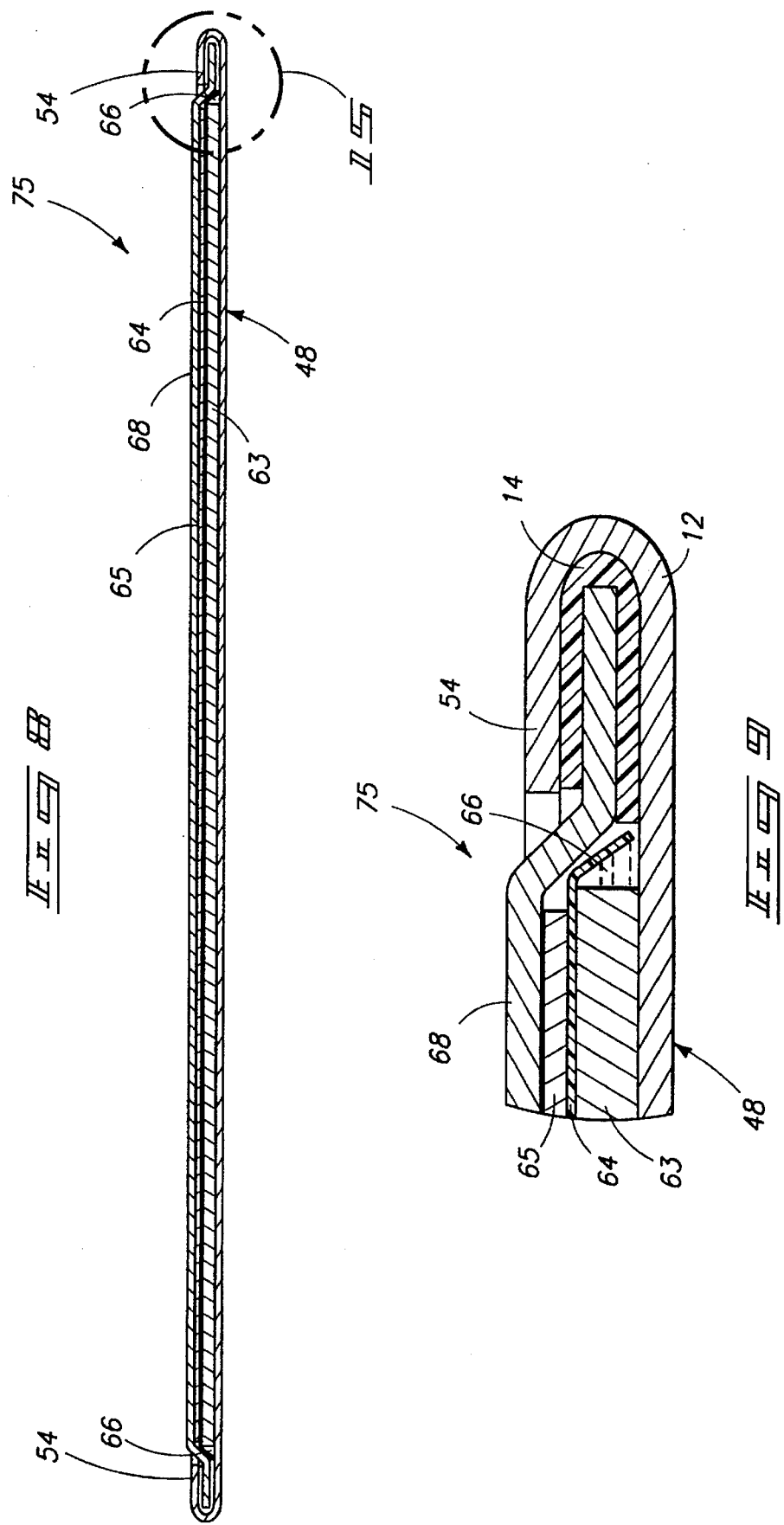

METHODS OF PRODUCING THIN PROFILE BATTERIES AND BATTERY TERMINAL HOUSING MEMBERS

TECHNICAL FIELD

This invention relates to methods of producing button-type batteries and button-type battery terminal housing members.

BACKGROUND OF THE INVENTION

Button-type batteries are small, thin energy cells that are commonly used in watches and other electronic devices requiring a thin profile. A conventional button-type battery includes two electrodes in the form of an anode and a cathode. These are separated by a porous separator. An electrolyte is present within pores of the separator.

These internal battery components are housed within a metal casing or housing formed by a lower conductive can and an upper conductive lid. A common prior art material for the can and lid is stainless steel. The can is typically in electrical contact with the cathode to form the positive battery terminal, and the lid is in electrical contact with the anode to form the negative battery terminal. The can and lid are crimped or pressed together to form a fluid-tight seal which entirely encloses the anode, cathode, separator, and electrolyte. An electrically insulating sealing gasket is provided within the primary seal between the lid and can to electrically isolate the two housing members.

This invention concerns the provision of the sealing gasket material relative to button-type battery terminal housing members.

BRIEF DESCRIPTION OF THE DRAWINGS

Preferred embodiments of the invention are described below with reference to the following accompanying drawings.

FIG. 6 is an enlarged, more-to-scale, cross-sectional, exploded view of a 20 mm diameter battery preassembly utilizing the FIGS. 4 and 5 housing member, and other components.

FIG. 7 is a cross-sectional view of the FIG. 6 assembly at a processing step subsequent to that shown by FIG. 6.

FIG. 8 is a cross-sectional view of an assembled button-type battery construction.

FIG. 9 is an enlarged cross-sectional view of a peripheral sealing portion of the FIG. 8 assembly.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In accordance with one aspect of the invention, a method of forming a button-type battery terminal housing member comprises the following steps:

providing an electrically conductive sheet having an exposed surface;

providing a discrete solid gasket body;

providing adhesive intermediate the conductive sheet exposed surface and the gasket body, and adhering the gasket body and conductive sheet together with the adhesive;

positioning the conductive sheet with the gasket body adhered thereto between first and second forming members; and moving at least one of the forming members in the direction of the other to bear one of the forming members against the gasket body to simultaneously bend the solid gasket body and conductive sheet into a desired battery terminal housing member shape, the adhesive retaining the solid gasket body fast against the conductive sheet outer surface during and after bending.

In accordance with another aspect of the invention, a method of forming a button-type battery terminal housing member comprises the following steps:

providing an electrically conductive sheet having an exposed surface, the conductive sheet being larger than a desired resultant battery terminal housing member to be produced therefrom;

providing a discrete solid gasket body, the gasket body being larger than a desired resultant gasket to be received relative to the battery terminal housing member;

providing adhesive intermediate the conductive sheet exposed surface and the gasket body, and adhering the gasket body and conductive sheet together with the adhesive;

positioning the conductive sheet with the gasket body adhered thereto between first and second forming members; and moving at least one of the forming members in the direction of the other to bear one of the forming members against the gasket body to simultaneously bend the solid gasket body and conductive sheet into a desired battery terminal housing member shape; the moving step also cutting through the gasket body, adhesive and conductive sheet; the adhesive retaining the solid gasket body fast against the conductive sheet outer surface during and after bending.

Figure 1:
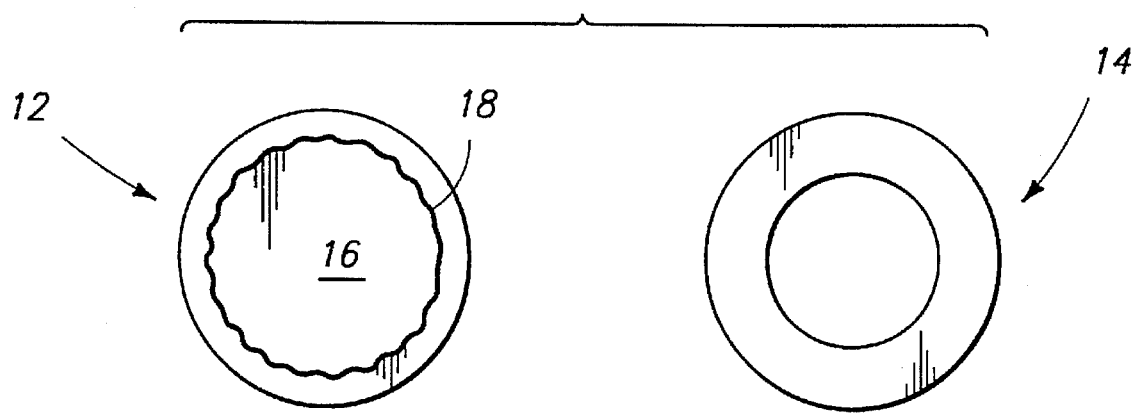
FIG. 1 is a top view of a components utilized in accordance with the invention.

A preferred method of forming a button-type battery terminal housing member in accordance with the invention is initially described with reference to FIGS. 1-5. FIG. 1 illustrates first and second battery components in the form of an electrically conductive sheet 12 and a discrete solid gasket body 14. Sheet 12 is both circular in shape and larger than a desired resultant battery terminal housing member to be produced therefrom. Such also includes an exposed surface 16. An example and preferred material for sheet 12 is stainless steel, or nickel coated stainless steel, having a nominal thickness of from 4 mils to 10 mils. Sheet 12 can alternately be of the exact desired final size for the resultant battery terminal housing member construction such that no material will be cut therefrom. Further alternately by way of example only, sheet 12 can constitute a continuous strip of material from which desired resultant battery terminal shapes can be cut.

Second component 14 constitutes a discrete solid gasket body, preferably in the form of an annulus or ring as shown.

In the preferred embodiment, gasket body 14 is also larger than a desired resultant gasket to be received relative to the resultant battery terminal housing member. Example preferred gasket materials include polypropylene, polyethylene, copolymers of polypropylene and polyethylene, cured epoxies, teflon and other fluoropolymers.

Figure 2:
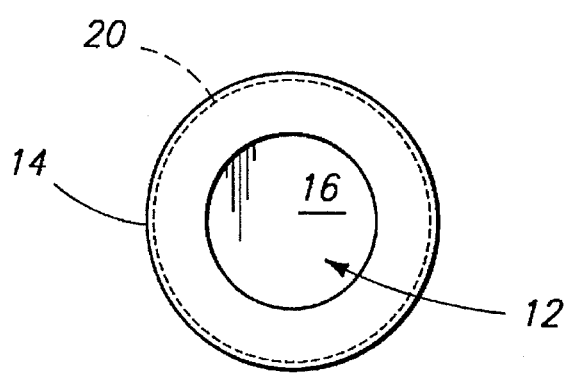
FIG. 2 is a top view of an assembly of the FIG. 1 components in accordance with the invention.

Referring to FIGS. 1 and 2, an adhesive is provided intermediate conductive sheet exposed surface 16 and gasket body 14, with the gasket body and conductive sheet being adhered together with the adhesive (FIG. 2). The adhesively joined gasket and conductive sheet may be referred to herein as a "gasket/sheet assembly". FIG. 1 illustrates an annular strip of adhesive 18 provided essentially about the peripheral portion of exposed surface 16 on disk 12. The adhesive can be applied in any manner which provides a desired pattern, such as what would be obtained by spinning the illustrated circular metal disk 12 about its center axis while applying adhesive along the outer perimeter thereof. At least one area per part, typically the center as shown, would be left free of adhesive coating to ultimately serve as a conductive node portion of the button-type battery.

A process of applying adhesive while disk 12 is spinning enables provision of a very thin, and uniform film of adhesive. Where a continuous strip of metal or other non-circular sheet is utilized, several alternate methods can of course be utilized. Such include by way of example only spray coating, screen printing, brush coating, flood coating, etc. Further, masking methods might also be utilized, such as masking areas of the conductive sheet with a masking material where adhesive is not desired. Such masking material would typically subsequently be removed. Example adhesives include, asphalt, epoxies, cyanoacrylates, butyl rubber, polysulfides, acrylics, etc., with asphalt being preferred. Line 20 in the preferred embodiment (FIG. 2) illustrates an example demarcation between a central portion and outer periphery of the desired cut battery terminal housing member, with the material outwardly of line 20 ultimately being discarded after cutting.

Figure 3:
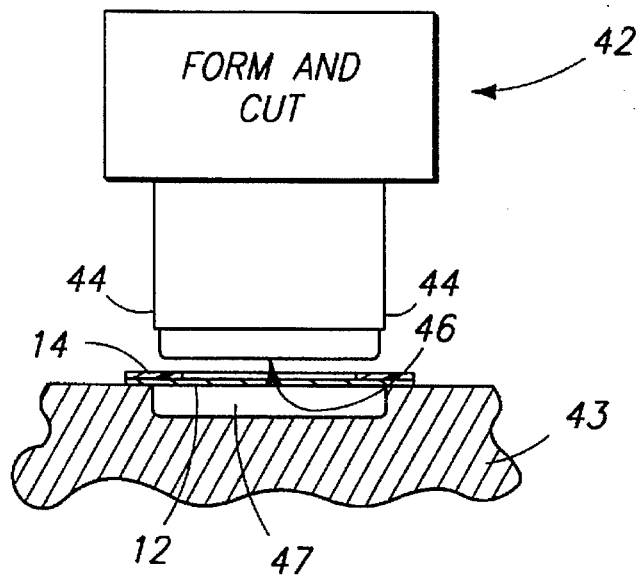
FIG. 3 is a diagrammatic side sectional plan view of a processing step in accordance with the invention.

Referring to FIG. 3, conductive sheet 12 with gasket body 14 adhered thereto is placed relative to a cutting and forming station 42. Such comprises a first forming member in the form of a central forming press 46 and a peripheral ring dye cutter 44. Such further comprises a second forming member 43 having a cavity 47 provided therein. In the described and preferred embodiment, the outer periphery of cavity 47 coincides with the size and shape of circle 20 of FIG. 2.

At least one of forming members 46/44 or 43 is moved in the direction of the other to bear forming member 46 against gasket body 14 to simultaneously bend solid gasket body 14 and conductive sheet 12 into a desired battery terminal housing member shape. Such moving action also will cut through gasket body 14, adhesive (not shown in FIG. 3), and conductive sheet 12 with ring die cutter edge 44. Forming member 46 will bear against gasket body 14 and impart bending moment thereto and to sheet 12 prior to cutting action by ring cutter 44. The adhesive received intermediate conductive sheet 12 and gasket body 14 will retain solid gasket body 14 fast against conductive sheet 12 outer surface 16 during and after all such bending and cutting actions. Prior art methods which have not utilized an intervening adhesive of effective degree between a discrete gasket and conductive disk have heretofore typically resulted in either some undesired movement of gasket body 14 relative to sheet 12 during the bending operation, or resultant springing or popping of gasket body 14 from the resultant composite after bending.

Figure 4:
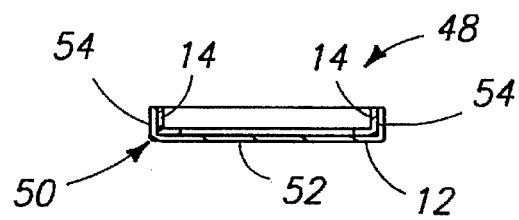
FIG. 4 is a side cross-sectional view of a single battery terminal housing member produced in accordance with methodical aspects of the invention.
Figure 5:
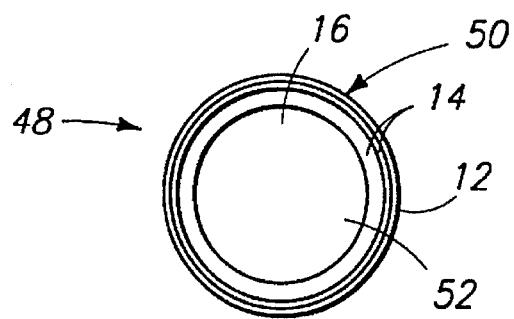
FIG. 5 is a top view of FIG. 4.

FIGS. 4 and 5 illustrate a resultant first terminal housing member 48 in the form of a container having a peripheral bend 50 extending continuously about a circular base 52 upwardly at approximately 90°, thus defining sealing peripheral portions 54.

Referring to FIG. 6, first terminal housing member 48 is provided with a cathode 63, porous separator 64, anode 65, and liquid electrolyte 66, which can be of conventional construction. For example, cathode 63 can be formed of a compressed tablet made from a combination of manganese (IV oxide), carbon and teflon powder. An example preferred thickness of cathode 63 is 8 mils (0.2032 mm). Separator 64 can be a woven or porous polymeric material, such as polyethylene or polypropylene. Additionally, a combination of two or more separators may be provided (not shown). An example preferred thickness of separator 64 is 1 mil (0.0254 mm). Anode 65 is preferably formed of elemental lithium. An example thickness of anode 65 is 2 mils (0.0508 mm). An example electrolyte 66 comprises a solution of propylene carbonate and 1,2-dimethoxyethane, having dissolved lithium hexafluoroarsenate. Suitable electrolyte components are supplied by Aldrich Chemical Company of Milwaukee, Wis. The volume of electrolyte 66 provided within first terminal housing member 48 is preferably gauged to saturate the separator and cathode within housing member 48, yet not so great to leak out upon crimp sealing the battery assembly. Further, bent gasket material 14 of first terminal housing member 48 has an outer surface which is provided with a coating 33 of adhesive thereabout to provide subsequent enhanced sealing during crimping.

Referring further to FIG. 6, a separately formed discrete electrically conductive second terminal housing member 68 is provided in facing juxtaposition to first terminal housing member 48. An example material for second housing member 68 would be 304 stainless steel having a thickness of 4 mils (0.1016 mm). The illustrated anode, cathode, separator and electrolyte are positioned intermediate first housing member 48 and second housing member 68. Anode 65 is positioned to ultimately electrically contact or otherwise electrically connect with second housing member 68, while cathode 63 is positioned to electrically contact or otherwise electrically connect with first housing member 48.

Referring to FIG. 7, second housing member 68 is pressed downwardly or relative to the other components while sealing peripheral portions 54 are further bent inwardly from 90° about peripheral bend 50. In the preferred and illustrated embodiment, the initial bend past 90° is by an additional 40°. This partial crimp effectively, if only temporarily, holds second terminal housing member 68 in a desired position with anode 65, separator 64, and cathode 63 therebeneath.

Referring to FIGS. 8 and 9, sealing peripheral portions 54 of first terminal housing member 48 are further bent about peripheral bend 50 to form a single continuous peripheral bend which effectively crimps first and second terminal housing members 48 and 68 together. Such effectively forms an enclosed battery housing 75 with gasket material 14 being interposed between such first and second terminal housing members to provide a fluid-tight seal and to provide electrical insulation there between. A preferred battery made in accordance with the above example thickness components can have a finished thickness of 0.5 mm (19.7 mils). Alternatively, a one-step crimping process may be used. In such one-step processes, the structure shown in FIG. 7 would constitute an intermediate position of the seal.

The resulting battery construction of FIGS. 8 and 9 may be referred to as a "thin profile battery", wherein a thin profile battery is defined as any battery comprising a thickness less than a maximum linear dimension of its anode. The above described embodiment is with respect to formation of a lower button-type battery terminal which functions as the initial container for retaining the internal components during crimping. Aspects of the invention will also be usable in creation of a button-type lid.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of forming a battery terminal housing member comprising the following steps:

providing an electrically conductive sheet having an exposed surface;

providing a discrete solid gasket body;

providing adhesive intermediate the conductive sheet exposed surface and the gasket body, and adhering the gasket body and conductive sheet together with the adhesive;

positioning the conductive sheet with the gasket body adhered thereto between first and second forming members; and moving at least one of the forming members in the direction of the other to bear one of the forming members against the gasket body to simultaneously bend the solid gasket body and conductive sheet into a battery terminal housing member shape, the adhesive retaining the solid gasket body fast against the conductive sheet outer surface during and after bending.

2. The method of forming a battery terminal housing member of claim 1 wherein the moving step includes cutting through the conductive sheet.

3. The method of forming a battery terminal housing member of claim 1 wherein the conductive sheet is circular in shape and wherein the moving step includes cutting through the circular conductive sheet.

4. The method of forming a battery terminal housing member of claim 1 wherein the gasket body as-adhered to the conductive sheet is in the shape of an annulus.

5. The method of forming a battery terminal housing member of claim 1 wherein the gasket body as-adhered to the conductive sheet is larger than the resultant gasket body, the moving step including cutting through the gasket body.

6. The method of forming a battery terminal housing member of claim 1 wherein the gasket body as-adhered to the conductive sheet is in the shape of an annulus, the annulus being larger than the resultant gasket body, the moving step including cutting through the gasket annulus.

7. The method of forming a battery terminal housing member of claim 1 wherein the step of providing the adhesive comprises initially applying the adhesive to the exposed sheet surface.

8. The method of forming a battery terminal housing member of claim 1 wherein the step of providing the adhesive comprises initially applying the adhesive to the gasket body.

9. The method of forming a battery terminal housing member of claim 1 wherein, the the moving step includes cutting through the conductive sheet; and the one forming member bearing against the gasket body prior to the cutting action.

10. The method of forming a battery terminal housing member of claim 1 wherein, the gasket body as-adhered to the conductive sheet is larger than the resultant gasket body, the moving step including cutting through the gasket body; and the one forming member bearing against the gasket body prior to the cutting action.

11. The method of forming a battery terminal housing member of claim 1 wherein, the gasket body as-adhered to the conductive sheet is in the shape of an annulus, the annulus being larger than the resultant gasket body, the moving step including cutting through the gasket annulus; and the one forming member bearing against the gasket body prior to the cutting action.

12. The method of forming a battery terminal housing member of claim 1 wherein, the conductive sheet is circular in shape and larger than the resultant battery terminal housing member shape, the moving step including cutting through the conductive sheet; and the one forming member bearing against the gasket body prior to the cutting action.

13. A method of forming a battery terminal housing member comprising the following steps:

providing an electrically conductive sheet having an exposed surface, the conductive sheet being larger than a resultant battery terminal housing member to be produced therefrom;

providing a discrete solid gasket body, the gasket body being larger than a resultant gasket to be received relative to the battery terminal housing member;

providing adhesive intermediate the conductive sheet exposed surface and the gasket body, and adhering the gasket body and conductive sheet together with the adhesive;

positioning the conductive sheet with the gasket body adhered thereto between first and second forming members; and moving at least one of the forming members in the direction of the other to bear one of the forming members against the gasket body to simultaneously bend the solid gasket body and conductive sheet into a battery terminal housing member shape; the moving step also cutting through the gasket body, adhesive and conductive sheet; the adhesive retaining the solid gasket body fast against the conductive sheet outer surface during and after bending.

14. The method of forming a battery terminal housing member of claim 13 wherein the electrically conductive sheet is circular in shape prior to the moving step.

15. The method of forming a battery terminal housing member of claim 13 wherein the gasket body as-adhered to the conductive sheet is in the shape of an annulus.

16. The method of forming a battery terminal housing member of claim 13 wherein the step of providing the adhesive comprises initially applying the adhesive to the exposed sheet surface.

17. The method of forming a battery terminal housing member of claim 13 wherein the step of providing the adhesive comprises initially applying the adhesive to the gasket body.

18. The method of forming a battery terminal housing member of claim 13 wherein the one forming member bears against the gasket body prior to the cutting action.

19. The method of forming a battery terminal housing member of claim 13 wherein, the electrically conductive sheet is circular in shape prior to the moving step; and the gasket body as-adhered to the conductive sheet is in the shape of an annulus.

20. The method of forming a battery terminal housing member of claim 13 wherein, the electrically conductive sheet is circular in shape prior to the moving step; and the one forming member bears against the gasket body prior to the cutting action.

21. The method of forming a battery terminal housing member of claim 13 wherein, the gasket body as-adhered to the conductive sheet is in the shape of an annulus; and the one forming member bears against the gasket body prior to the cutting action.

22. The method of forming a battery terminal housing member of claim 13 wherein, the electrically conductive sheet is circular in shape prior to the moving step;

the gasket body as-adhered to the conductive sheet is in the shape of an annulus; and the one forming member bears against the gasket body prior to the cutting action.

23. A method of forming a thin profile battery having a thickness less than a maximum linear dimension of its anode, comprising the following steps:

providing an electrically conductive sheet having an exposed surface;

providing a discrete solid gasket body;

providing adhesive intermediate the conductive sheet exposed surface and the gasket body, and adhering the gasket body and conductive sheet together with the adhesive;

positioning the conductive sheet with the gasket body adhered thereto between first and second forming members;

moving at least one of the forming members in the direction of the other to bear one of the forming members against the gasket body to simultaneously bend the solid gasket body and conductive sheet into a first battery terminal housing member, the adhesive retaining the solid gasket body fast against the conductive sheet outer surface during and after bending;

providing a discrete electrically conductive second terminal housing member in facing juxtaposition to the first terminal housing member;

providing an anode and a cathode having a separator and electrolyte positioned therebetween; the anode, cathode, separator and electrolyte being positioned intermediate the juxtaposed first and second terminal housing members; the anode being positioned to electrically connect with one of the first or second terminal housing members and the cathode being positioned to electrically connect with the other of the first or second terminal housing members; and crimping the first and second terminal housing members together into an enclosed battery housing with the gasket body being interposed between the first and second terminal housing members to provide a fluid-tight seal and to provide electrical insulation therebetween.

24. The method of forming a thin profile battery of claim 23 wherein the gasket after bending comprises an outer surface, the method further comprising applying an adhesive to the gasket outer surface prior to the crimping step.

25. The method of forming a thin profile battery of claim 23 wherein the the moving step includes cutting through the conductive sheet.

26. The method of forming a thin profile battery of claim 23 wherein the conductive sheet is circular in shape and larger than the resultant battery terminal housing member shape, the moving step including cutting through the circular conductive sheet.

27. The method of forming a thin profile battery of claim 23 wherein the gasket body as-adhered to the conductive sheet is in the shape of an annulus.

28. The method of forming a thin profile battery of claim 23 wherein the gasket body as-adhered to the conductive sheet is larger than the resultant gasket body, the moving step including cutting through the gasket body.

29. The method of forming a thin profile battery of claim 23 wherein the gasket body as-adhered to the conductive sheet is in the shape of an annulus, the annulus being larger than the resultant gasket body, the moving step including cutting through the gasket annulus.

30. The method of forming a thin profile battery of claim 23 wherein the step of providing the adhesive comprises initially applying the adhesive to the exposed sheet surface.

31. The method of forming a thin profile battery terminal housing member of claim 23 wherein the step of providing the adhesive comprises initially applying the adhesive to the gasket body.

32. The method of forming a thin profile battery of claim 23 wherein, the moving step includes cutting through the conductive sheet; and the one forming member bearing against the gasket body prior to the cutting action.

33. The method of forming a thin profile battery of claim 23 wherein, the gasket body as-adhered to the conductive sheet is larger than the resultant gasket body, the moving step including cutting through the gasket body; and the one forming member bearing against the gasket body prior to the cutting action.

34. The method of forming a thin profile battery of claim 23 wherein, the gasket body as-adhered to the conductive sheet is in the shape of an annulus, the annulus being larger than the resultant gasket body, the moving step including cutting through the gasket annulus; and the one forming member bearing against the gasket body prior to the cutting action.

35. The method of forming a thin profile battery of claim 23 wherein, the conductive sheet is circular in shape and larger than the resultant battery terminal housing member shape, the moving step including cutting through the conductive sheet; and the one forming member bearing against the gasket body prior to the cutting action.

36. A method of forming a battery terminal housing member comprising the following steps:

adhering a gasket to a substantially flat conductive sheet with an adhesive to form a gasket/sheet assembly; and bending the gasket/sheet assembly into a battery terminal housing member shape.

37. A method of forming a battery terminal housing member comprising adhering a gasket to a substantially flat conductive sheet with an adhesive before bending the sheet into a battery terminal housing member shape.

38. A method of forming a battery terminal housing member comprising the following steps:

adhering a gasket and a conductive sheet together with an adhesive to form a gasket/sheet assembly, the gasket/sheet assembly comprising a surface area;

cutting through the gasket/sheet assembly to reduce the surface area; and bending the gasket/sheet assembly into a battery terminal housing member shape.

39. A method of forming a thin profile battery, comprising the following steps:

adhering a gasket and a conductive sheet together with the adhesive to form a gasket/sheet assembly;

bending the gasket/sheet assembly into a first battery terminal housing member;

providing a discrete electrically conductive second terminal housing member in facing juxtaposition to the first terminal housing member;

providing an anode, a cathode, a separator and an electrolyte between the first and second terminal housing members; and crimping the first and second terminal housing members together into an enclosed battery housing.

* * * * *